Aug. 13, 1968  J. C. PETREA  3,396,808

MATERIAL-IN-SUSPENSION COMPENSATOR AND TARE ADJUSTER

Filed June 6, 1967

INVENTOR

JAMES C. PETREA

BY Bacon & Thomas

ATTORNEYS

United States Patent Office 3,396,808
Patented Aug. 13, 1968

3,396,808
MATERIAL-IN-SUSPENSION COMPENSATOR
AND TARE ADJUSTER
James C. Petrea, Durham, N.C., assignor, by mesne assignments, to Wright Machinery Company, Inc., a corporation of North Carolina
Filed June 6, 1967, Ser. No. 643,967
6 Claims. (Cl. 177—165)

ABSTRACT OF THE DISCLOSURE

Material feeding means delivering a stream of material to a weighing bucket moving along a path. When a predetermined or preset weight of material is at rest in the bucket, the feeding means is stopped but "material-in-suspension" between the feeder and the bucket causes an overfill. After the feeding means has stopped, a cam adjacent the bucket path reduces the tare weight of the bucket by supporting part of the weight of a movable element on the bucket and if the overfill did not at least equal this reduction in tare weight additional material is added.

BACKGROUND OF THE INVENTION

This invention relates to weighing machines and particularly to an improvement for minimizing overfill of packages requiring a minimum net weight.

In practically all commercial packaging operations wherein products are weighed and placed in packages, the product is delivered to a weighing device wherein at least a portion of the product is dropped through the air into a weighing bucket or the like. Customarily, the weighing bucket responds to the weight of material resting therein to terminate the feed of material when a predetermined minimum weight is achieved. However, the bucket is responsive only to the material already at rest therein and at the time that material reaches the preset or minimum required weight and the material feeding means is cut off, a small amount of material is in suspension in the process of dropping from the feeding apparatus into the weighing bucket. That material then becomes part of the charge and constitutes an overweight. In the course production runs with automatic machinery, each container contains some overfill and in a period of time this represents a substantial loss to the packager.

SUMMARY OF THE INVENTION

The present invention constitutes means and method for reducing the overfill problem outlined above. According to the invention, a weighing apparatus is preset to stop feed of material to a weighing bucket when the material at rest in the bucket approaches the desired minimum weight but is a predetermined amount below that value. Thus, at least some of the weighed charges will be either below or just at the ultimate required weight even though some of the weighed charges will be overweight. After the weighing process has proceeded to the point where material feed to the weighing bucket has stopped, a portion of the tare weight of the weigh bucket is removed, which would normally result in an underweight indication. However, due to the overfill feature described at least some of the charges will still be over full weight although some will be underweight after reduction of the tare weight of the bucket. In the latter instance, the detecting mechanism of the weighing apparatus restarts the material feeder until the material in the bucket reaches the new set point resulting from reduction of tare weight.

DESCRIPTION OF THE PREFERRED EMBODIMENT

Figure 1:
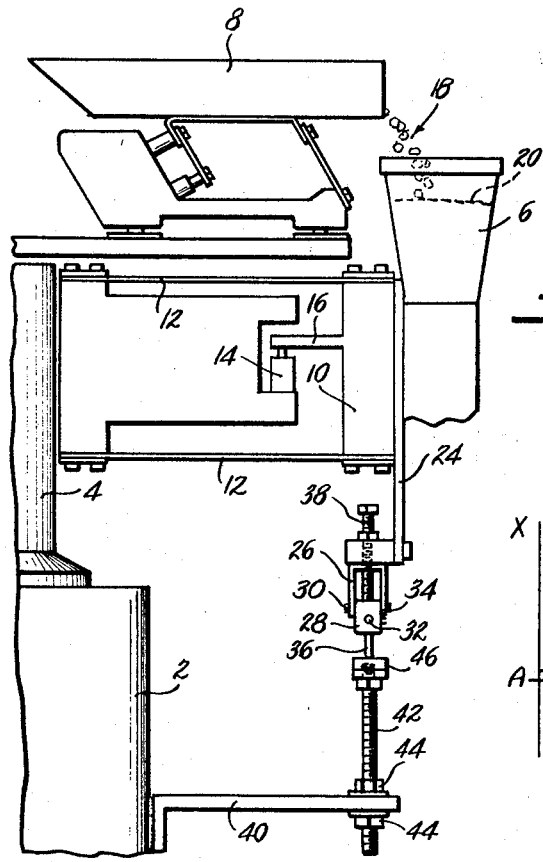
FIG. 1 is a schematic elevational view of a portion of the weighing apparatus involving the present invention.

FIG. 1 illustrates, by way of example only, a portion of a weighing apparatus which may be similar to the weighing apparatus disclosed in the patent to Harmon et al., No. 3,108,647. That patent shows material feeding apparatus and control features along with structural details adaptable to the apparatus of the present invention. In FIG. 1, numeral 2 indicates a stationary base for a rotary turret structure 4 having a multiplicity of weigh buckets 6 thereon and a vibratory material feeder 8 for each bucket 6. The weigh bucket 6 is carried by a head structure 10 suspended from the turret 4 by parallel leaf springs 12, all in a well known manner, and described in more detail in the aforementioned patent. The vibratory conveyor 8 is preferably electrically operated in a well known manner and is under control of a detecting device 14 associated with the related weigh bucket 6. As is known, and more fully described in the Harmon patent, when a predetermined weight of material has been deposited in the weigh bucket 6 by the conveyor 8 or other means, the weigh bucket moves vertically downwardly until a finger 16 on the head 10 actuates the detecting device 14 and that occurs when the predetermined weight has been achieved. Actuation of the device 14 interrupts the operating current to conveyor 8 and the latter stops. As indicated in FIG. 1, material being fed from the conveyor 8 into the weigh bucket 6 drops from the end of the conveyor into the bucket and a portion 18 of the material is in suspension between the end of the conveyor and the surface 20 of the material already at rest in the weigh bucket. This condition exists at the time the conveyor 8 is stopped and the required or preset weight of material is already at rest in the bucket 6. Thus, the material 18, which is referred to herein as "material-in-suspension" will fall into the bucket 6 and become part of the charge deposited in a package. That portion 18 constitutes overfill or, in other words, excess product by which the weight of the charge deposited in each package is greater than the minimum required.

Figure 2:
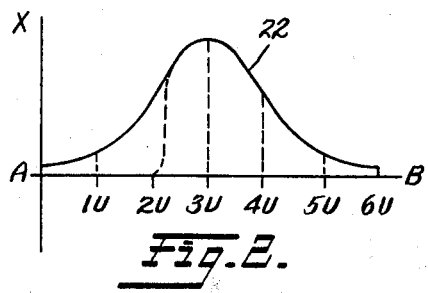
FIG. 2 is a graph showing the normal distribution of different quantities of overfill resulting from normal operation of the usual weighing apparatus.

Referring now to FIG. 2, the abscissa axis A–B represents the weight of the overfill in weight units. The units may be any desired unit for purpose of discussion. In the example shown, the curve 22 is in fact the well known probability curve, the height of each point representing the quantity or number of packages overfilled by the amount of overweight shown on the absissa therebelow. The point A or the start of the curve 22 represents the set point of the scale or the minimum weight for which the weighing operation has been preset. The number of weight units of material in suspension at 18 varies since the material is not perfectly homogeneous and cannot be fed in an absolutely uniform stream. Therefore, the number of units of overweight varies from package to package. The curve 22, however, represents the distribution of overweight units as measured over a great many weighing operations and in the example shown, the average overweight deposited in the package is three weight units although some of the overweights are less than that and a minimum number of overweight charges exceed the minimum by six weight units. It will be apparent that the sum of all the overweights in successive packages represents a substantial loss to the packager. To at least partially correct this situation and reduce the amount of excess material delivered to the consumer, the weighing apparatus is provided with a compensator mechanism which will now be described.

Figure 3:
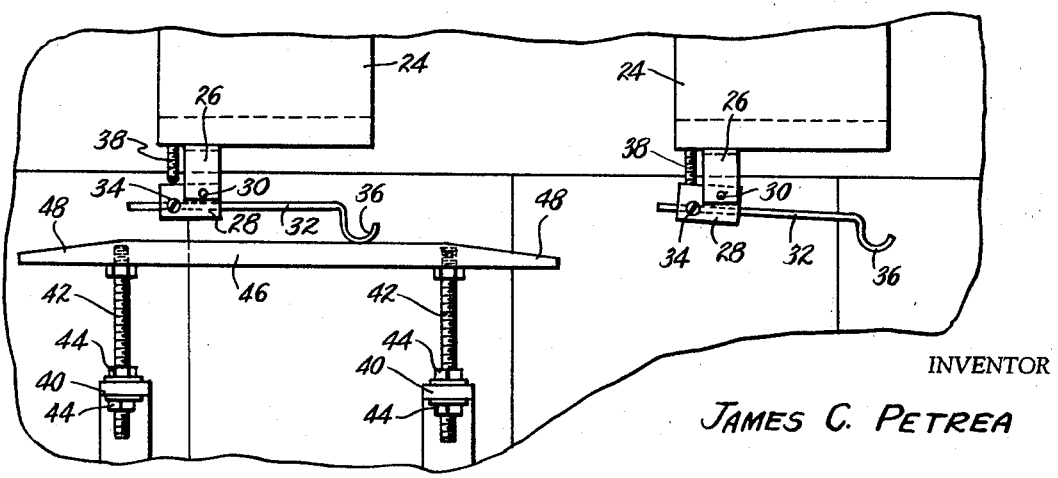
FIG. 3 is a view of the apparatus of FIG. 1 as seen from the right hand side thereof.

Each weighing head 10 is provided with a depending plate 24 having a supporting bail or bracket 26 depending therefrom. A weight 28 is pivoted between the legs of the bracket 26 on an eccentrically positioned pivot pin 30. A rod 32 extends slidably through the weight 28 and can be fixed in any longitudinal position of adjustment therein by means of a set screw or the like 34. The center of gravity of the combined weight 28 and rod 32 is on the right hand side of pivot 30, as viewed in FIG. 3, so that gravity urges the weight and rod to rotate clockwise about the pivot 30. Adjustment of rod 32 in weight 28 shifts that center of gravity toward or from pivot 30. An outer end of the rod 32 is bent downwardly, then curved upwardly to define the hook-like portion 36 shown in the drawings. The plate 24 is provided with an adjustable stop screw 38 in position to engage a portion of the weight 28 and limit its clockwise rotation about pivot 30, under the influence of gravity, as clearly exhibited on the right hand side of FIG. 3.

A pair of brackets 40 are fixed to the turret base 2 to extend outwardly therefrom. An adjustable threaded rod 42 extends vertically through each bracket and is held in adjusted position by means of opposed nuts 44 whereby the rod may be adjusted vertically and locked in position relative to its bracket 40. The pair of rods 42 support a cam bar 46 of limited length but having sloped end portions 48. As previously stated, the turret 4 is provided with a multiplicity of weigh buckets 6 and rotates constantly during an operating cycle. A bulk charge of material is customarily first placed in each weigh bucket and the conveyor 8 constitutes a dribble feed device to gradually bring the weight of the charge up to the scale set point. The rate of material feed can be adjusted so that the preset charge is deposited in each bucket before it reaches the cam bar 46. In other words, by the time each weigh bucket 6 reaches a position over the cam bar 46, conveyor 8 has been stopped and presumably the preset weight of material has been deposited in the bucket. However, as each weigh bucket passes over the cam bar 46, the hook end 36 of each rod 32 will ride up the sloping leading end of the cam bar and will actually lift the hook 36 and rotate the weight 28 a small amount counterclockwise about its pivot 30. This condition is shown at the left side of FIG. 3. As will be obvious, at least a part of the weight defined by an element 28 and rod 32 is now supported by the cam bar 46 and the amount of weight so supported has in effect reduced the tare weight of the weighing apparatus by that amount. Upon reaching the position shown at the left of FIG. 3, if the reduction in tare weight is sufficient to cause the weigh bucket to rise enough to deactuate the detector 14, the conveyor 8 will be restarted and an additional quantity of material will be deposited in the bucket 6 until the conveyor is again stopped in the manner already described.

Referring again to FIG. 2, let it be assumed that the minimum desired or required weight of each charge is represented by the point 2U. The weighing mechanism will be so adjusted that durting the preliminary filling of the bucket, the operation of conveyor 8 is stopped at point A, that is at a joint two weight units below the finally required net weight. In view of the normal overweights already described, at least some of those charges will equal or exceed the minimum required weight even though the set point of the scale is below the required weight, this being due to the distribution curve 22 already described. With the scale set point at the point A of FIG. 2, the rod 32 can be so adjusted that when it rides up on the cam bar 46, it will reduce the tare weight of the weigh bucket by two weight units and this, in effect, shifts the set point of the scale to the point 2U of FIG. 2. For those buckets wherein the previous "overfill" was less than two weight units, the conveyor 8 will again be started and will deposit enough additional material in the bucket to bring its net weight up to the point 2U and the conveyor will then stop even though a slight additional overfill will result. For those weigh buckets that were initially overfilled to a point equal to or exceeding the point 2U in FIG. 2, no additional material will be deposited since detector 14 will not restart the conveyor 8. Thus, the final or resultant distribution curve of overweights above the point 2U will remain substantially unchanged, the same as the curve 22 above the point 2U but the curve will drop suddenly down to the point 2U and represents a saving in overfills while ensuring that each charge is at least up to the required minimum. The overfills to the right of point 2U will remain as originally deposited but it is to be noted that the average "overfill" (which was originally three units) is now much closer to the minimum required weight (represented by the point 2U) and the average overfill is more nearly the required minimum weight (only one unit) which represents a substantial saving in product.

While a single specific embodiment of the invention has been shown and described herein, the same is merely illustrative of the principles involved and other forms may be resorted to within the scope of the appended claims.

I claim:

1. Weighing apparatus comprising: a generally vertically movable weigh bucket movable downwardly in response to the weight of material placed therein; a weight means movably mounted on said bucket; and lifting means separate from said bucket for selectively engaging and supporting at least a part of the weight of said weight means to relieve said bucket thereof and thereby reduce its weight tare.

2. Weighing apparatus as defined in claim 1 wherein said weigh bucket is mounted for movement along a predetermined generally horizontal path, said lifting means comprising a cam member, adjacent said path, arranged to engage said weight means, as said bucket moves therepast along said path, to support said part of its weight.

3. Weighing apparatus as defined in claim 2 wherein said weight means is pivotally mounted on said bucket about a generally horizontal axis and with its center of gravity eccentric to said axis, and arm means extending laterally from said axis and having a portion slidably engageable with said cam member.

4. Weighing apparatus as defined in claim 3 wherein said portion of said arm means is mounted on said weight means for selective adjustment toward and from said axis.

5. Weighing apparatus as defined in claim 2 including material feeding means for depositing material to be weighed in said bucket; and control means responsive to vertical movement of said bucket to a predetermined position to terminate operation of said feeding means; said cam member being positioned along said path in position to engage said weight means after said bucket normally reaches said predetermined position.

6. Weighing apparatus as defined in claim 1 wherein said weight means is pivotally mounted on said bucket about a generally horizontal axis and with its center of gravity eccentric to said axis; and stop means limiting gravity-induced pivotal movement of said weight means in one direction about said axis to a position where said center of gravity is horizontally displaced from said axis.

References Cited

UNITED STATES PATENTS

| | | | |
|---|---|---|---|
| 1,175,573 | 3/1916 | Weyant | 177—122 |
| 3,023,822 | 3/1962 | Knobel | 177—229 X |
| 3,193,030 | 7/1965 | Meier | 177—164 |

RICHARD B. WILKINSON, *Primary Examiner.*

GEORGE H. MILLER, JR., *Assistant Examiner.*